US008440282B2

(12) United States Patent
Uribe

(10) Patent No.: US 8,440,282 B2
(45) Date of Patent: May 14, 2013

(54) PARTABLE ROLL LABEL

(75) Inventor: Rueben Uribe, Alta Loma, CA (US)

(73) Assignee: Pregis Innovative Packaging, Inc., Deerfield, IL (US)

( * ) Notice: Subject to any disclaimer, the term of this patent is extended or adjusted under 35 U.S.C. 154(b) by 141 days.

(21) Appl. No.: 12/911,623

(22) Filed: Oct. 25, 2010

(65) Prior Publication Data

US 2012/0100328 A1 Apr. 26, 2012

(51) Int. Cl.
*B32B 7/06* (2006.01)

(52) U.S. Cl.
USPC ................ 428/43; 428/906; 242/580; 40/674

(58) Field of Classification Search .................... 428/43, 428/906; 242/580, 160.1, 160.4, 164; 206/389, 206/410; 40/674; 283/81; 229/87.05
See application file for complete search history.

(56) References Cited

U.S. PATENT DOCUMENTS 1,827,636 A * 10/1931 Ames ......................... 229/123.2
2,091,346 A 8/1937 Wright
2,096,960 A 10/1937 Colbey
2,105,367 A 1/1938 Parsons
2,940,196 A 6/1960 Schor
3,700,138 A 10/1972 Nelson
4,661,188 A 4/1987 Fumei
4,936,464 A * 6/1990 Kim ........................... 229/123.1
5,450,949 A * 9/1995 Cocchi et al. ................. 206/225
5,472,089 A 12/1995 Specogna et al.
5,639,529 A 6/1997 Gozdecki et al.
7,357,252 B2 4/2008 Franks

* cited by examiner

*Primary Examiner* — Alexander Thomas
(74) *Attorney, Agent, or Firm* — Dorsey & Whitney LLP

(57) ABSTRACT

A rolled article includes a roll of material and a holding device positioned on the roll and extending across the free end of the roll, securing the free end against an adjacent portion of the roll surface for preventing the roll from unraveling, the holding device including a base article having first and second securing regions positioned adjacent respective opposite sides of the base article and having a linking portion positioned therebetween, the first securing region secured to the roll surface on a first side of the free end and the second securing region secured to the roll on a second side of the free end, and first and second parting features disposed between respective first and second securing regions and the linking portion, wherein the parting features are configured for facilitating parting the base article between the linking portion and the securing regions to unroll the roll.

25 Claims, 4 Drawing Sheets

PARTABLE ROLL LABEL

FIELD OF THE INVENTION

The present disclosure relates to a holding device for use in shipping and handling items. More particularly, the present disclosure relates to a partable label for holding rolled materials to prevent unraveling.

BACKGROUND

Known packaging for protecting products during shipping and handling include printed bags or shrink sleeves. Such packaging is presently used for items including low density, bulky items, such as rolls of foam or air-bubble packaging sheet, primarily to contain the rolls for easier stacking, handling, and transportation, although often the potential protective aspects of the packaging. In such applications, especially when the packaged materials are inexpensive, the packaging can represent a significant portion of the cost of the item that is packaged.

One known packaging concept can be found in U.S. Pat. No. 2,105,367, which discloses a wrapper or label placed around toilet packages. The wrapper or label may be removed from the package by tearing a strip of paper from the wrapper or label from one exposed edge to the other. In U.S. Pat. No. 3,700,138 to Nelson, a method of dispensing interfolded sheet material is presented. A folded clip of sheet material is wrapped with a paper or other protective wrap 42, the longitudinal ends of which are subsequently closed by means of adhesive tape. Perforations 46 provide for opening of the wrap.

Improved packaging and labeling is needed for such items as low-density, low-cost items that do not require protective packaging.

SUMMARY

The present disclosure, in one embodiment, may include a rolled article including a roll of material having an outer surface and a free end and a holding device positioned on the roll and extending across the free end, securing the free end against an adjacent portion of the roll surface for preventing the roll from unraveling. The holding device may include a first and second securing regions positioned adjacent respective opposite sides, or preferably on opposite edges, of the holding device and having a linking portion positioned therebetween. The first securing region may be secured to the roll surface on a first side of the free end and the second securing region may be secured to the roll on a second side of the free end. Preferably, the linking portion extends over a discontinuous portion of the roll surface. The holding device may further include a first parting feature disposed between the first securing region and the linking portion and a second parting feature disposed between the second securing region and the linking portion. The parting features may be configured for facilitating parting of the holding device between the linking portion and the securing regions to unroll the roll.

The preferred first and second securing regions are disposed on opposite edges of the holding device. Also, the holding device can be a label with marketing information or identifying information displayed between the first and second securing regions. The securing regions can comprise adhesive regions disposed on an inner surface of the securing regions, securing the securing regions to the roll surface, and each securing region can have a narrow width compared to a width of the linking portion. The parting features can comprise lines of perforations, or a pull cord, for example.

The material of the roll is preferably a low-density material, such as a lightweight packing material. The material can be, for example, a sheet of air-bubble packaging or foam sheet. The roll preferably has an effective density of less than about 20 lb/ft 3

In another embodiment, a method of making a rolled article may include providing a roll of material having a flap with a free end, the flap overlapping an outer surface of the roll and being positioned adjacent a contiguous, discontinuous portion of the roll. The method may further include positioning a holding device across the free end, the holding device having first and second securing regions with respective first and second securing devices, securing the first securing device to the flap, and securing the second securing device to the discontinuous portion of the roll wherein, the roll is held in rolled form and prevented from unraveling.

The holding device can be made of a sheet material and can be made of paper or include a paper layer in a laminate. The securing regions can have an adhesive, such as in a strip or other configuration, for securing to the roll surface, and the securing of the securing devices can include removing a backing from the adhesives and contacting the adhesive region against the roll. The positioning of the holding device across the free end can include arranging sides of the holding device generally parallel to the free end. Also, the holding device can include parting features allowing the holding device to be parted for unraveling the roll with the securing regions left behind secured to the roll surface.

DETAILED DESCRIPTION

The present disclosure relates to a partable holding device. The device can be a label with securing devices or systems, such as adhesive regions, used to hold rolled materials in rolled form to prevent unraveling for transportation and storage. The label can have a parting feature such as a region of perforations allowing a portion of the label to be torn free, leaving a portion behind, and allowing the rolled material to be unrolled and used. The holding and parting device can reduce the need for other packaging which can significantly increase the cost of packaging and shipping the item, such as when used with rolled materials of a low density, low-cost material.

Figure 1:
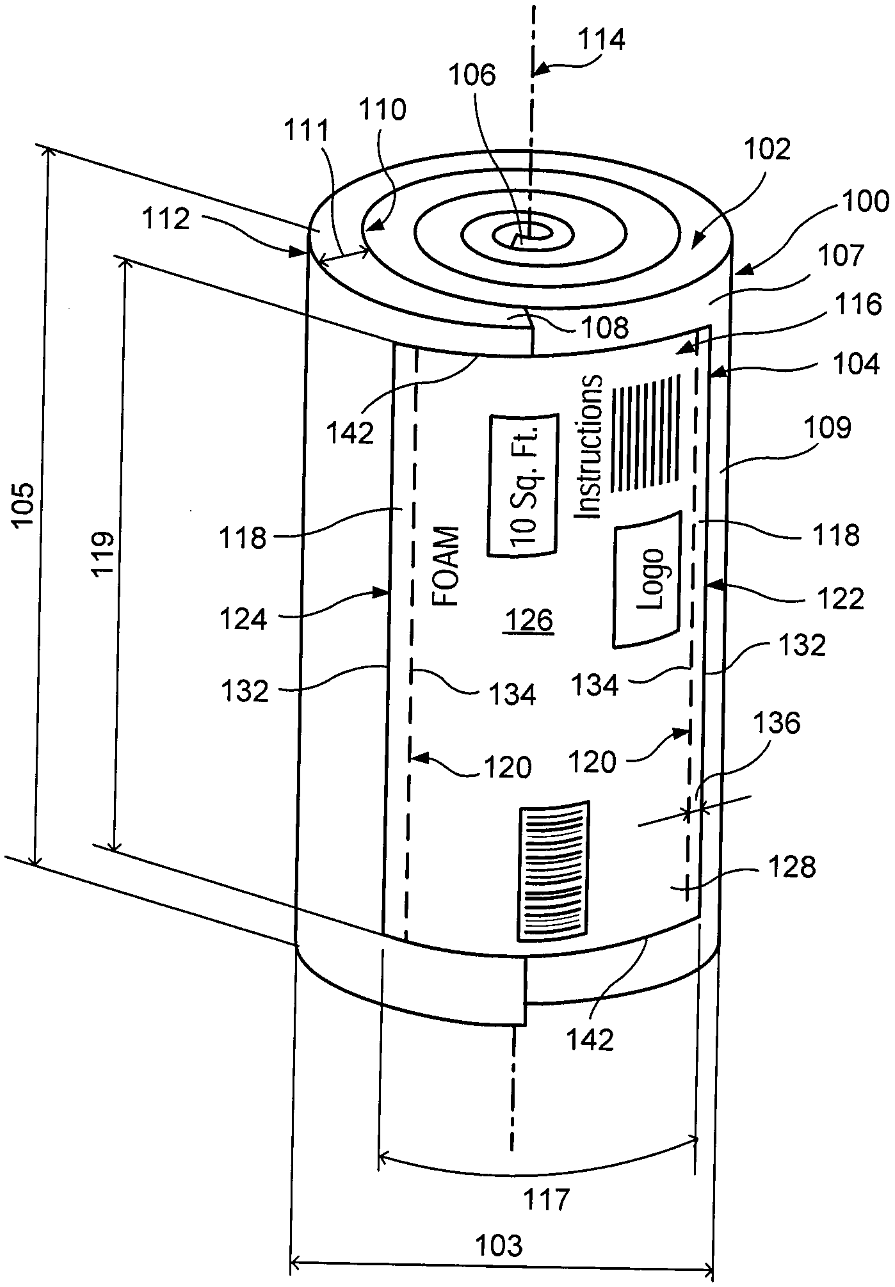
FIG. 1 is a perspective view of an article suitable for shipping and handling including a roll of foam material and a holding device.

Referring now to FIGS. 1 and 2, an article 100 suitable for shipping and handling is shown. The article 100 can include a deliverable, which is preferably in the form of a material wound into a roll 102. The article 100 may also include a partable holding device 104 secured to the roll 102. The roll 102 can include a tucked end 106 and a free end 108. The tucked end 106 can be an edge or side of the material near the center of the roll 102, reflecting the beginning of the rolled shape. The free end 108 can be an edge or side of the material toward which the tucked end 106 was rolled. As such, the free end 108 can lap on an outer surface 107 of the roll 102. The holding device 104 can be used to secure the free end 108 to a portion 109 of the outer surface 107 remote from the free end 108 along the length of the material as measured in an unrolled state, but adjacent to the free end 108 in the rolled configuration to hold the roll 102 in rolled form and prevent unraveling of the roll 102. In the rolled configuration, the holding device 104 connects and overlaps a contiguous, discontinuous part of the outer surface 107 of the roll 102 to keep the free end 108 attached to the portion 109 of the outer surface 107.

The roll 102 is preferably a material that has a flexibility allowing it to be rolled. Although other materials can be used, examples of suitable rolled materials include paper, rubber, foil, plastic sheet, bubble packaging, foam, wall paper, or carpeting. Other materials can also be used. Preferably, the rolled material is a sheet of material, typically having a thickness of between about ⅛ inches up to about ½ inches, although other thicknesses can be used in alternative embodiments. In some embodiments, the holding device 104 is particularly advantageous to reduce packaging costs when using the device 104 with lighter weight or low density materials. For example, a low density roll may include flexible foams or other air-filled cushioning materials.

A flexible foam, such as that shown in FIG. 1, may have a density ranging from approximately 0.5 pcf to approximately 5 pcf. In other embodiments, the flexible foam may have a density ranging from approximately 1 pcf to approximately 4 pcf. In still other embodiments, the foam may have a density of approximately 2 to approximately 3 pcf, and in one embodiment, the density is around 3 pcf. The foam may include film, paper, or other laminations, and can alternatively have other densities. Other flexible foams or foam/film laminates may also be used. Most foam will be produced from a polyethylene or polypropylene based resin in thicknesses from 1/32 inches up to ½ inches thicknesses, although other configurations can alternatively be used.

Figure 2A:
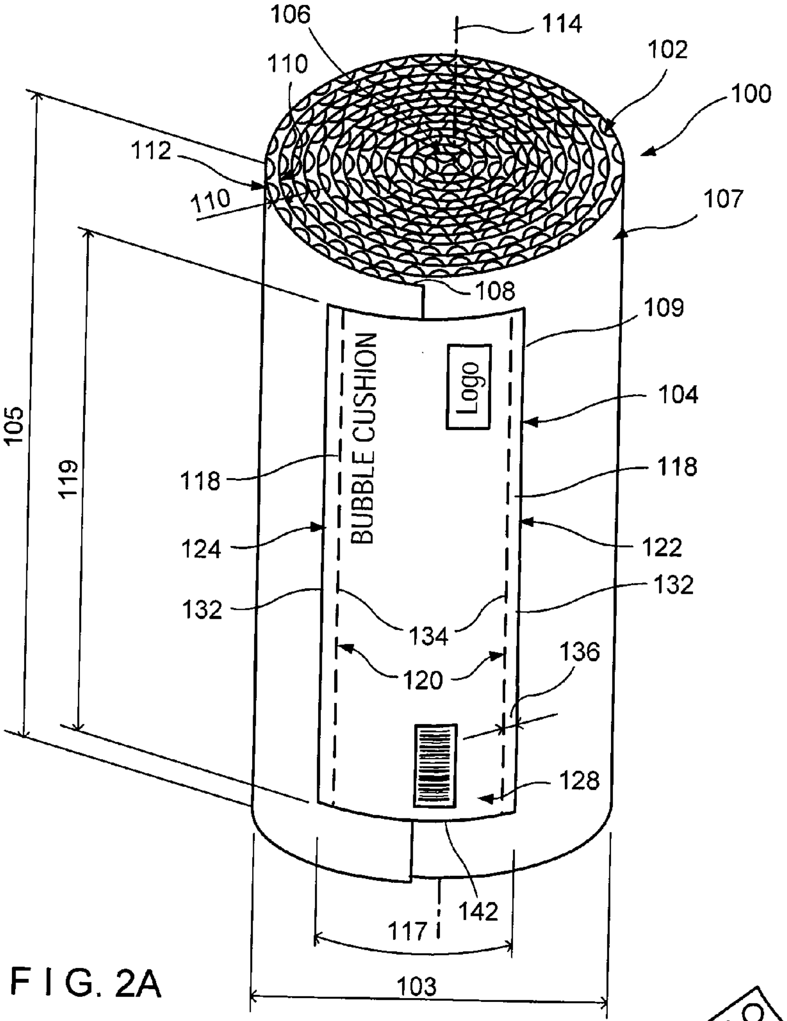
FIG. 2A is a perspective view of an article suitable for shipping and handling including a roll of bubble cushion material and a holding device.
Figure 2B:
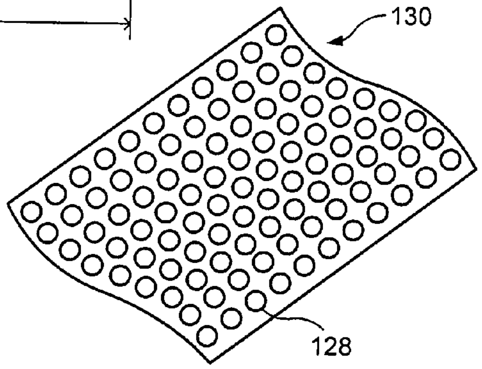
FIG. 2B is a perspective view of a piece of the bubble cushion material taken from the roll of FIG. 2A.

For air-filled cushioning materials, such as that shown in FIGS. 2A and 2B, the thickness may typically ranges from approximately ⅛ inches to approximately ½ inches, with other thicknesses being useable. The air-filled cushioning material may include a pair of films that are intermittently separated by pockets of air. In some embodiments, the resulting material may include one substantially flat side where the pockets of air form bubbles on the opposite side. In other embodiments, pockets of air may protrude out both sides of the material. In still other embodiments, the material may include two flat sides separated by bubbles positioned therebetween. Examples of materials used in the air-filled cushioning material include polyethylene, polypropylene or a coextruded polyethylene nylon construction material. Other materials may be used to form the air-filled cushioning material.

The overall bulk of the roll is preferably high when compared to its weight. While heavier rolls can be used with the present invention, a preferred embodiment of a roll having a diameter 103 of about 20 inches and a height 105 of about 24 inches preferably weighs less than about 5 pounds, more preferably less than about 3 pounds, and most preferably less that about 2 pounds. One such embodiment weighs about 1.5 pounds. Typical roll diameters are at least about 10 or 15 inches and up to about 25 or 30 inches, and typical roll heights 103 are at least about 15 or 20 inches and up to about 30 or 40 inches. Typical effective roll densities, calculated based on the roll diameter 103 and height 105, are less than about 20 $lb/ft^3$, more preferably less than 10 $lb/ft^3$, and most preferably less than about 7 $lb/ft^3$. A preferred embodiment has an effective roll density of about 4 to 5 $lb/ft^3$. It is envisioned that other dimensions, weights, and roll densities can be used.

Depending on the nature of the material and its intended use, the material in the roll 102 can have an upper side 110 and a lower side 112. In some embodiments, the upper side 110 is generally intended to be exposed and the lower side 112 is not. In the case of wall paper, for example, the upper side 110 can be the exposed side and the lower side 112 can have a backing to be applied to a wall. As shown in FIGS. 1 and 2, the material in the roll 102 can be arranged such that the upper side 110 faces inward toward a central axis 114 of the roll 102 and the lower side 112 faces generally radially outward. The roll 102 can also be rolled with the upper side 110 facing radially outward away from the central axis 114 of the roll 102 and the lower side 112 facing inward toward the central axis 114 of the roll 102.

Figure 3:
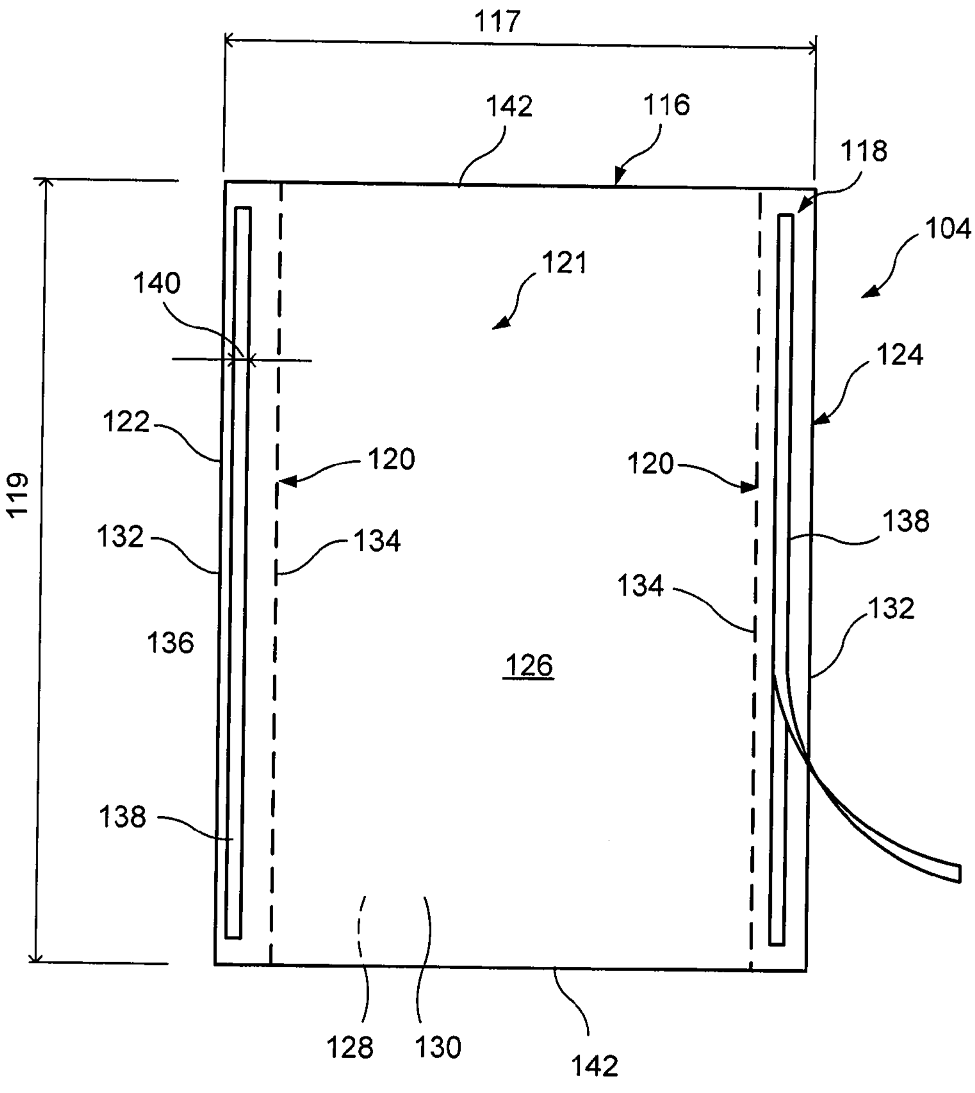
FIG. 3 is a plan view of a lower surface of the holding device of FIGS. 1 and 2.

Referring now to FIG. 3, a close-up view of the holding device 104 of FIG. 1 is shown. The holding device 104 shown is in the form of a label configured for securing to and holding a roll 102 of material in a rolled position. The label is also configured for parting, allowing the roll 102 to unravel while leaving a portion of the label behind. The holding device 104 can include a base article 116 including a plurality of securing regions 118 and a linking portion 121 positioned between the securing regions 118. The securing regions 118 may each be separable from the base article 116 by a parting feature 120.

The base article 116 of the holding device 104 can be configured for conforming to the contour of the outer surface of the roll 102 and for spanning across a seam, joint, or other discontinuity in the roll 102. For example, the base article 116 may span across the free end 108 of the roll of material shown in FIG. 1 and further conform to the curved shape of the roll 102. The base article 116 may be a square, rectangular or other oblong shape, or a rounded or other shape may be provided. The base article 116 can include two sides 122, 124 adapted for positioning on either side of the seam or joint. In the embodiment shown, the base article 116 has two sides 122, 124 that extend generally parallel to one another on opposite ends of the base article 116, and are separated by a distance defining a field 126 of the base article 116. Other suitable orientations, shapes, and placements of the sides 122, 124 can be used in other embodiments.

The base article 116 can have an outer surface 128 and an inner surface 130. One embodiment of the inner surface 130 of the base article 116 is shown in FIG. 3. In some embodiments, the outer surface 128 can have identifying information provided thereon. The identifying information can include a product name relating to the roll 102, a material type, a bar code, logo indicia, or other identifying information. Additional identifying information can include material quantities, sizes, available usage, or instructions for use of the roll 102. In some embodiments, in addition to identifying information, the base article 116 may also include marketing information describing the benefits and advantages associated with the use of the roll 102. Additional information may also be provided on the inner surface 130 of the base article 116. For example, instructions for use of the roll 102 or other information that may not need to be readily viewable until the product is being installed may be provided. Other information may also be provided. The information provided on the outer and/or inner surfaces 128, 130 of the base article 116 can extend across the full extent of the field 126 of the base article 116 or a more limited area may be used. For example, the information may be provided between the securing regions 118, although in other embodiments such information may be provided additionally or alternatively on one or both securing regions.

The base article 116 can be a flexible or malleable material and can also be relatively thin with a reasonable amount of tensile strength to resist inadvertent parting. For example, the base article can be a paper material, fiber-reinforced paper material, or a poly or reinforced poly material.

The base article 116 can be any size. In some embodiments, the base article 116 can have a width 117 and/or height 119 ranging from approximately 1 inch to approximately 18 inches. In other embodiments, the base article 116 can have a width 117 and/or height 119 ranging from approximately 3 inches to approximately 15 inches. In still other embodiments, the base article 116 can have a width 117 and/or height 119 ranging from approximately 8 inches to approximately 12 inches. Any combination of width 117 and height 119 may be provided. In one embodiment, as shown, the base article 116 may be approximately 8 inches wide by approximately 12 inches high, although other sizes are also envisioned for use with larger or smaller rolls.

In relation to the roll 102, the base article 116 may have a width 117 measured along the circumference of the roll 102 that is approximately 3 times the diameter 103 of the roll 102 allowing the base article 116 to extend substantially fully around the roll 102. In other embodiments, the base article 116 may have a width 117 of approximately 1½ times the diameter 103 of the roll 102 allowing the base article 116 to extend approximately ½ of the way around the roll 102. In still other embodiments, the base article 116 may have a width 117 of approximately ¾ times the diameter 103 of the roll 102 allowing the base article 116 to extend approximately ¼ of the way around the roll 102. Other width to diameter relationships may be provided. In further relation to the roll 102, the base article 116 may have a height 119 measured parallel to the axis 114 of the roll 102 that is approximately equal to the height 105 of the roll 102. In other embodiments, the base article height 119 may be approximately 90% of the height 105 of the roll 102. In still other embodiments, the base article height 119 may be approximately 75% of the height 105 of the roll 102. Other base article heights 119 relative to the roll height 105 may be provided.

The base article 116 can include a plurality of securing regions 118 configured for attaching the base article 116 to the roll 102. The securing regions 118 can be positioned along the sides 122, 124 of the base article 116 such that the base article 116 can be adhered to the roll 102 on each side of the free end 108, or of another seam or joint of the roll 112. Each securing region 118 can have an outboard edge 132 aligned with a respective side 122, 124 of the base article 116. Each securing region 118 can also have an inboard edge 134 spaced apart from the outboard edge 132 and positioned in the field 126 of the base article 116. The portion of the base article 116 between the inboard edges 134 of the securing portions 118 may be referred to as the linking portion 121.

The distance between the outboard and inboard edges 132, 134 can define a width 136 of the securing region 118. The securing region 118 can have a width 136 that is relatively small compared with the width 117 of the base article 116. In some embodiments, the relatively small width 136 can range from approximately 1⁄16 inch to approximately 3 inches. In other embodiments, the width 136 of the securing region 118 may range from approximately ⅛ inch to approximately 1 inch. In still other embodiments, the width 136 of the securing region 118 may be approximately ¼ inch. When compared to a base article width 117 measured between the attachment sides 122, 124 ranging from approximately 6 inches to approximately 18 inches, the width 136 of the securing region 118 can be said to be relatively small. For example, the width 136 of the securing region 118 may range from approximately 1⁄288 to ⅓ of the width 117 of the base article 116. In other embodiments, the width 136 of the securing region 118 may range from approximately 1⁄120 to ⅛ of the width 117 of the base article 116. In still other embodiments, the width 136 of the securing region 118 may range from approximately 1⁄48 to 1⁄32 of the width 117 of the base article 116.

The securing regions 118 can include one or a combination of several securing devices or systems 138 positioned on the inner surface of the holding device 104 and within the securing regions 118. In one embodiment, as shown in FIG. 2A, the securing region 118 can include a securing device 138 in the form of an adhesive region or strip covered with a release liner or backing. The adhesive region or strip can be continuous or it can be intermittent with one or several release liners extending across the adhesive portions. In other embodiments, the securing device 138 can be an applied glue. In other embodiments, the securing device 138 can be a gripping region or strip such as a toothed surface for biting into the roll material or a hook and loop surface such as, for example Velcro® or Aplix®, for engaging the surface of the roll 102. Other suitable securing devices or systems can be used.

The securing device 138 may be positioned to extend along the length of the securing region 118 and may be centered between the inboard and outboard edges 132, 134 of the securing region 118. In other embodiments, the securing device 138 may be positioned closer to the outboard edge 132 or closer to the inboard edge 134. The securing device 138 may have a width 140 commensurate with the width 136 of the securing region 118 or a more narrow width 140 may be provided. That is, where a 1 inch wide securing region 118 is provided, for example, a commensurate ¾ inch or ⅞ inch wide securing device 138 may be provided or a more narrow ¼ inch wide securing device 138 may be provided. In some embodiments, for example a ¼ inch wide securing region 118 may be provided and a commensurate 3⁄16 inch or ¼ inch wide securing device 138 may be provided. In other embodiments, other configurations and sizes of the securing device are envisioned.

As mentioned with regard to FIGS. 1 and 2, the securing regions 118 can be separable from the base article 116 by parting features 120. The parting features 120 can be configured for allowing separation in the field 126 of the base article 116. More particularly, the parting features 120 can be configured for allowing separation of the securing region 118 and the base article 116 along the inboard edge 134 of the securing region 118. That is, the parting feature 120 may be positioned along the inboard edge 134 allowing parting of the base article 116 between the securing region 118 and the linking portion 121. As such, parting features 120 can extend along and/or define the inboard edge 134 of the securing regions 118 and can further define a weakened or tear-prone area.

In some embodiments, as shown in FIG. 3, the parting feature 120 can be in the form of a line of perforations or another region of weakness. The perforation line can include a plurality of holes, material depressions, slits, or slots, for example, which are arranged in a pattern and configured to guide the tearing of the base article 116. The pattern of arrangement may be a linear arrangement or a wavy or curved arrangement depending on the desired tear pattern.

In other alternative embodiments, the parting feature 120 can be in the form of a pull-chord type device where a string or chord with a relatively high tensile strength is embedded in the base article 116 or adhered to the lower surface 130 of the base article 116. In this embodiment, the string or chord may have a portion extending beyond the base article 116 or a gripping tab may be provided. When the string or chord is pulled, the string or chord can tear through the base article 116 material thereby parting the material.

In still other embodiments, the parting feature 120 may include a thinned, pressed, or otherwise weakened or tear-prone area. In this embodiment, the parting feature 120 may be provided with leading notches or slits in the base article 116 at one or both ends of the parting feature 120. In this embodiment, pulling or tearing the base article 116 can cause the notches or slits to create a tear line along the weakened or tear prone area thereby parting the base article 116 from the securing region 118. Other parting features can be provided.

In operation and use, and with reference again to FIGS. 1 and 2, a holding device 104 in the form of a label may be used to secure a roll of material for shipping and handling. A material such as, for example, air-bubble packaging material or a sheet of foam may be rolled, creating a tucked end 106 and the rolling may continue across the full length of the material, creating a flap near the opposite free end 108 of the rolled material. Once any backing material is removed from adhesive strips, one adhesive strip can be secured to the flap by contacting or pressing the securing region thereagainst, the label 102 may be positioned on the roll with the sides 122, 124 of the label extending over and across the free end 108 to retain the free end 108 against the adjacent, discontinuous portion of the roll outer surface 107, thereby preventing unraveling, each side 122, 124 of the label preferably extending generally parallel to the free end 108. The edges 142 of the label extending between the sides 122, 124 of the label may be free edges 142 that are not secured to the roll. In the present embodiment, the label may include identifying and/or marketing type information about the air-cushioning material and the roll 102 together with the label may be handled and shipped to an end user, a retailer, or other location.

Figure 4:
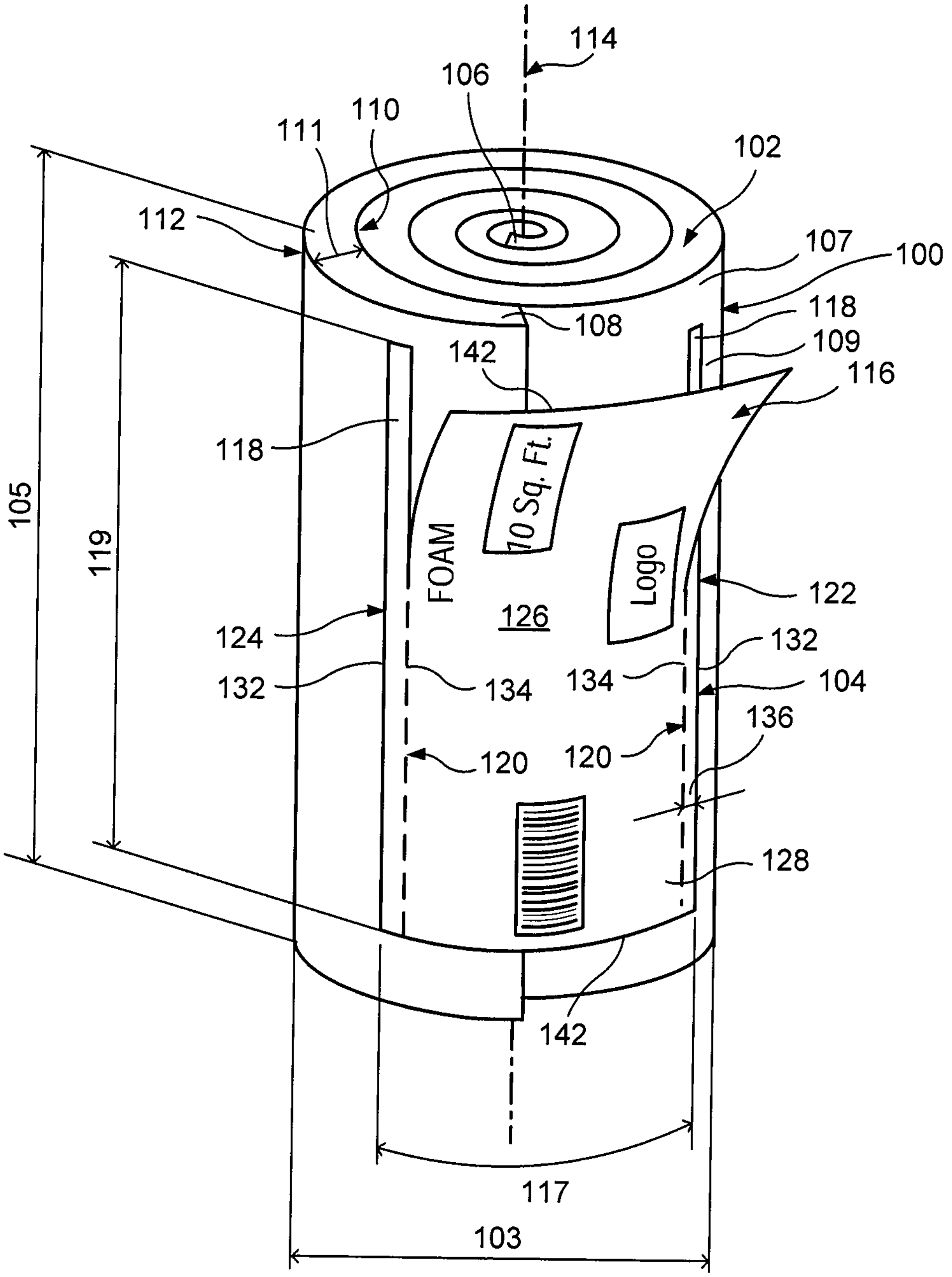
FIG. 4 is a perspective view of an article of FIG. 1 or 2, with the holding device in a semi-parted condition.

When an end user is ready to use the rolled product, the label may be removed by gripping the free edges 142 of the label between the securing regions 118, as shown in FIG. 4. The user may then tear the label free from the securing regions 118 along the parting feature 120 extending adjacent to and along the length of the securing regions 118. In the preferred embodiment, this leaves two narrow strips (securing regions 118) stuck on the surface of the roll. Many rolled materials can be used with these strips still attached. The material can then be unraveled and used with the securing regions 118 remaining attached on the surface of the material.

It is noted that where the material includes an upper, or exposed side 110, and a lower, or hidden side 112, in the rolling step above, the material can be oriented such that the lower side 112 faces radially outward relative to the center axis 114 of the roll. Accordingly, when the label is attached, it will be attached to the lower or hidden side 112 and when removed, the securing regions 118 will remain on the hidden side 112 of the material and not on the exposed side 110. Accordingly, effort associated with removing the securing regions 118 from the material may be avoided.

In light of the operation and use discussed, a method of making a roll 102 with a label may include any or all of the following steps in any order. A roll 102 of material may be provided having a free end 108 positioned adjacent an outer surface 107 of the roll 102. A holding device 104 having securing regions 118 and parting features 120 may be positioned on the roll 102 with sides 122, 124 positioned on each side of the free end 108. A first securing device or system 138 near a first side 122 may be secured to the roll 102 on a first side of the free end 108. A second securing device or system 138 near a second side 124 may be secured to a discontinuous portion 109 of the roll 102 on a second side of the free end 108, thereby securing the free end 108 to the roll 102 and making the roll 102 suitable for shipping and handling.

One having ordinary skill in the art should appreciate that there are numerous shapes and sizes of holding devices for which there can be a need or desire to ship and/or handle items according to an exemplary embodiment of the present invention. Additionally, one having ordinary skill in the art will appreciate that although the preferred embodiments illustrated herein reflect a generally flat and rectangular holding device, the holding device can have a variety of shapes and sizes.

As used herein, the terms “front,” “back,” and/or other terms indicative of direction are used herein for convenience and to depict relational positions and/or directions between the parts of the embodiments. It will be appreciated that certain embodiments, or portions thereof, can also be oriented in other positions.

In addition, the term “about” should generally be understood to refer to both the corresponding number and a range of numbers. In addition, all numerical ranges herein should be understood to include each whole integer or fraction thereof within the range. While an illustrative embodiment of the invention has been disclosed herein, it will be appreciated that numerous modifications and other embodiments can be devised by those skilled in the art. Therefore, it will be understood that the appended claims are intended to cover all such modifications and embodiments that come within the spirit and scope of the present invention.

What is claimed is:

1. A rolled article, comprising:

a roll of material having an outer surface and a free end; and a holding device positioned on the roll and extending across the free end, securing the free end against an adjacent portion of the roll surface for preventing the roll from unraveling, the holding device having a circumferential width about the roll and comprising:

a first securing region secured to the roll surface on a first side of the free end;

a second securing region secured to the roll on a second side of the free end, the securing regions occupying a securing fraction of the circumferential width;

a linking portion disposed between and connecting the securing regions and occupying a linking fraction of a circumferential width from the first to the second securing regions, the linking fraction of the width being significantly greater than the securing fraction of the width;

a first parting feature disposed between the first securing region and the linking portion, and a second parting feature disposed between the second securing region and the linking portion;

wherein the parting features are configured for facilitating parting the holding device between the linking portion and the securing regions to enable the roll to be unrolled.

2. The rolled article of claim 1, wherein the first and second securing regions are disposed on opposite edges of the holding device.

3. The rolled article of claim 1, wherein the securing regions comprise adhesive regions disposed on an inner surface of the securing regions, securing the securing regions to the roll surface.

4. The rolled article of claim 1, wherein each securing region has a width that is up to about ⅛ the circumferential width of the holding device.

5. The rolled article of claim 1, wherein the parting features comprise lines of perforations.

6. The rolled article of claim 1, wherein the parting features comprise a pull chord.

7. The rolled article of claim 1, wherein the material of the roll is of a low-density material.

8. The rolled article of claim 7, wherein the material of the roll is a lightweight packing material.

9. The rolled article of claim 8, wherein the material of the roll comprises a sheet of air-bubble packaging.

10. The rolled article of claim 8, wherein the material of the roll comprises foam sheet.

11. The rolled article of claim 1, wherein the roll has an effective density of less than about 20 $lb/ft^3$.

12. The rolled article of claim 1, wherein the roll has an effective density of less than about 10 $lb/ft^3$.

13. The rolled article of claim 1, wherein the holding device is made of a sheet material.

14. The rolled article of claim 13, wherein the holding device comprises paper.

15. The rolled article of claim 1, wherein the linking portion extends over a discontinuous portion of the roll surface.

16. The rolled article of claim 1, wherein the circumferential width of the holding device is at least approximately ¼ times the diameter of the roll of material, and a height that is at least approximately ¾ of the height of the rolled article.

17. The rolled article of claim 16, wherein each securing region has a width that is up to about ⅛ the circumferential width of the holding device.

18. The rolled article of claim 17, wherein the roll is of a low-density material.

19. The rolled article of claim 18, wherein the linking portion comprises a label and includes marketing information and identifying information related to the roll of material displayed on the linking portion between the first and second securing regions.

20. The rolled article of claim 19, wherein the linking portion includes usage information related to the roll of material.

21. The rolled article of claim 1, wherein the free end has a thickness of approximately ⅛ inches up to approximately ½ inches, and the linking portion has a width sufficient to span across the thickness of the free end with the first and second securing regions each disposed entirely on a surface located on either side of the free end.

22. The rolled article of claim 1, wherein the holding device comprises a label and includes instructions for use of the rolled article displayed on the linking portion between the first and second securing regions.

23. The rolled article of claim 22, wherein the linking portion comprises a label and includes marketing information and identifying information related to the roll of material, and usage information related to the roll of material.

24. A rolled article, comprising:

a roll of material having an outer surface and a free end; and a holding device positioned on the roll and extending across the free end, securing the free end against an adjacent portion of the roll surface for preventing the roll from unraveling, the holding device having a circumferential width about the roll and comprising:

a first securing region having a width that is up to approximately ⅛ of the circumferential width and secured to the roll surface on a first side of the free end;

a second securing region secured to the roll on a second side of the free end, the securing regions occupying a securing fraction of the circumferential width;

a linking portion disposed between and connecting the securing regions;

a first parting feature disposed between the first securing region and the linking portion, and a second parting feature disposed between the second securing region and the linking portion;

wherein the linking portion occupies a linking fraction of a circumferential width from the first to the second parting features, the linking fraction of the width being significantly greater than the securing fraction of the width;

wherein the parting features are configured for facilitating parting the holding device between the linking portion and the securing regions to enable the roll to be unrolled.

25. The rolled article of claim 24, wherein the second securing region has a width that is up to approximately ⅛ of the circumferential width.

* * * * *